US006381705B1

United States Patent
Roche

(10) Patent No.: US 6,381,705 B1
(45) Date of Patent: Apr. 30, 2002

(54) METHOD AND DEVICE FOR REDUCING CURRENT CONSUMPTION OF A MICROCONTROLLER

(75) Inventor: Franck Roche, Trets (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/435,661

(22) Filed: Nov. 8, 1999

(51) Int. Cl.$^7$ ................................................. G06F 1/04
(52) U.S. Cl. ....................................... 713/601; 713/322
(58) Field of Search ................................ 713/500, 501, 713/600, 601, 322

(56) References Cited

U.S. PATENT DOCUMENTS

| 5,454,114 A | * | 9/1995 | Yach et al. ................... 713/330 |
| 5,546,568 A | | 8/1996 | Bland et al. .................. 395/550 |
| 6,026,498 A | * | 2/2000 | Fuse et al. ................... 713/600 |
| 6,256,746 B1 | * | 7/2001 | Cheng ......................... 713/600 |

FOREIGN PATENT DOCUMENTS

| EP | 0 421 431 A2 | 10/1990 |
| WO | 97/34218 | 9/1997 |

* cited by examiner

Primary Examiner—Dennis M. Butler
(74) Attorney, Agent, or Firm—Lisa K. Jorgenson; Allen, Dyer, Doppelt, Milbrath & Gilchrist, P.A.

(57) ABSTRACT

A method and device reduces consumption of a microcontroller, allowing the microcontroller to enter into an "active halt" mode in which the central processing unit, the internal peripheral circuits, and a clock tree are deactivated. The main oscillator is operative and delivers an oscillating signal. An internal interruption returns the microcontroller back into the run mode and is generated after a time delay obtained by an internal circuit activated by the oscillating signal.

28 Claims, 2 Drawing Sheets

METHOD AND DEVICE FOR REDUCING CURRENT CONSUMPTION OF A MICROCONTROLLER

FIELD OF THE INVENTION

The present invention relates to electronic devices, and, more particularly, to a method and device for reducing the current consumption of a microcontroller.

BACKGROUND OF THE INVENTION

Referring to FIG. 1, a microcontroller MCU is an integrated circuit comprising various internal circuits. These internal circuits include a central processing unit CPU, a main oscillator OSC, a clock signal generating circuit MCC producing a clock signal $f_{CPU}$ (from a signal delivered by the main oscillator), as well as internal peripheral circuits. In the following description, the terms "internal", "external", "inside" and "outside" are relative to the package of the microcontroller MCU, the latter being schematically shown in FIG. 1 by a box in broken lines.

The internal peripheral circuits, e.g., comprise an EPROM or EEPROM type memory MEM, a watchdog circuit WDG, at least one analog-to-digital converter ADC and/or at least one digital-to-analog converter DAC, counters, etc. The memory MEM is loaded by the customer with a user program at a programming stage prior to using the microcontroller in its application.

One of the desires of integrated circuit manufacturers is to reduce circuit current consumption as much as possible. Indeed, in many applications the power supply for the electronic circuit incorporating the integrated circuit is a battery or cell whose charge is limited in time. Moreover, reducing the power consumption of integrated circuits limits heat dissipation problems due to the Joule effect (Joule losses). Accordingly, the continuous development of integrated circuit technology makes it possible to reduce their power consumption. This reduction relates to the "static" consumption, in the sense that it does not depend on the operation of the integrated circuit.

On the other hand, microcontrollers are becoming increasingly complex in the sense that they incorporate an increasing number of internal circuits to meet the users' growing needs. As a consequence, the efforts made in the technology for reducing current consumption are all too often greatly offset by the increase in size and complexity of the integrated circuits. Indeed, the consumption of a microcontroller is strongly linked to the number of transistors (elementary components) it contains, since consumption results from the switching of these transistors.

For this reason, it has long been suggested in the field of microcontrollers to deactivate the integrated circuit in the intervals during which it is not active in the application. Under such conditions, the microcontroller is sometimes referred to as being in the standby state. Similarly, it has also been suggested to deactivate only some of the microcontroller's internal circuits when these circuits do not need to be active in the operation of the microcontroller. Both of the above measures lead to a "dynamic" reduction in current consumption insofar as the savings obtained depend on the use of the microcontroller.

Consequently, microcontrollers known in the art can be run in different modes in which a certain number or all of their internal circuits are deactivated. In the above two paragraphs and what follows in the present description (unless otherwise stated), the terms "activated" and "deactivated" applied in the context of an internal circuit of a microcontroller mean, respectively, that the circuit in question receives or does not receive the clock signal $f_{CPU}$.

For instance, in the ST7 microcontroller family marketed by the firm STMicroelectronics S.A., the following operating modes are distinguished:

(1) a RUN or "EXECUTION" mode, in which all of the microcontroller's internal circuits are activated (FIG. 1); the RUN mode is the normal operating mode, the one in which the user program is executed; it is the default operating mode, i.e. the one in which the microcontroller is entered after its power on reset and after each subsequent reset;

(2) a "SLOW" operating mode, in which the frequency of the clock signal $f_{CPU}$ is reduced compared to its nominal value; the CPU and the microcontroller's peripheral circuits are activated by this reduced frequency clock signal; this mode already lowers current consumption since the lower the frequency the fewer the number of transistors are switched per unit time; naturally, the microcontroller's operating speed is correspondingly reduced;

(3) a "WAIT" mode in which the CPU is deactivated while the internal peripheral circuits are activated; the microcontroller is set into this operating mode upon executing an adapted instruction of the user program known as a wait instruction; classically, the microcontroller is thus set into the WAIT mode during the period assigned for an operation carried out by an internal peripheral circuit (e.g. an analog-to-digital conversion executed by an ADC circuit), such an operation being independent of the CPU; the microcontroller is returned from the WAIT mode to the RUN mode by an internal interruption (generated by the aforementioned microcontroller internal peripheral circuit when that operation is terminated); this interruption allows the CPU to resume operation for executing the following instruction designated by its program counter; naturally, it is also possible to provide for the microcontroller to return from the WAIT mode to the RUN mode upon receipt of an external interrupt signal EXT_INT or an external reset signal RST on appropriate input pins of the microcontroller package; the WAIT mode decreases consumption by withdrawing the contribution of the CPU during the time periods when it is not operative;

(4) a SLOW WAIT mode, which is a combination of the two previous modes, respectively, SLOW and WAIT;

(5) a HALT mode, in which the main oscillator ceases to operate (i.e. it no longer generates a signal $f_{OSC}$); accordingly, the CPU and the microcontroller internal peripheral circuits are deactivated since they no longer receive a clock signal $f_{CPU}$; as with the WAIT mode, the microcontroller is set into the HALT mode by executing an appropriate instruction of the user program, known as a HALT instruction; conversely, the microcontroller is brought back from the HALT mode to the RUN mode only when the CPU receives one of the above-mentioned EXT_INT or RST signals via appropriate input pins of the microcontroller package (see FIG. 1).

Of all the above operating modes, the HALT mode is the most economical in terms of current consumption. However, it suffers the drawback of involving a risk of blocking the microcontroller. Indeed, all the internal circuits of the icrocontroller are deactivated in the HALT mode (they do not receive any clock signal since the main oscillator is inoperative). Unless an external interrupt signal or an external reset signal is generated, the microcontroller could remain blocked indefinitely in the HALT mode. It is imperative to make provisions for these external signals in the application, which provides a constraint for the user.

The WAIT mode can overcome this drawback since the clock signal $f_{cpu}$ is always generated in the WAIT mode and an internal interruption can always be generated to bring the microcontroller back to the RUN mode. However, since the clock signal $f_{cpu}$ is transmitted as an input to each microcontroller internal circuit, Joule losses occur in the set of connections provided for this transmission. This set is commonly referred to as a "clock signal distribution tree" or more simply as a "clock tree" and is designated by reference CLKTR in FIG. 1. In addition, this is the reason why the clock signal $f_{cpu}$ is generally greatly amplified in the MCC circuit which comprises several buffers (not shown) for that purpose. This is the reason why the WAIT mode, although more economical than the RUN mode, is less economical than the HALT mode.

SUMMARY OF THE INVENTION

In view of the foregoing background, it is therefore an object of the invention to overcome the above-mentioned drawbacks with microcontrollers according to the prior art.

In accordance with the invention, this object is achieved by virtue of a new microcontroller operating mode. In the following description, this mode is termed the ACTIVE-HALT mode. The broad concept of the invention includes combining the advantages of the HALT mode with those of the WAIT mode.

On the basis of this concept, there is suggested an operating mode in which the main oscillator OSC no longer operates (so providing the advantages of the HALT mode), but in which a specific internal peripheral circuit generates an internal interruption after a predetermined time period. This internal interruption allows all of the microcontroller's internal circuits to be activated again by bringing the microcontroller back to the RUN mode. Such an internal peripheral circuit can be formed, e.g., by a counter COUNT, such as shown in FIG. 1. Naturally, it requires a specific time base to operate. The latter can be supplied from the outside by an oscillating signal or an external clock signal. It can also be generated internally by an auxiliary oscillator OSC-AUX shown in FIG. 1.

However, this auxiliary oscillator occupies additional chip area in the microcontroller, which is undesirable. This is why a microcontroller according to the invention can operate according to an ACTIVE-HALT mode which is implemented differently.

Indeed, the invention contemplates a method of reducing the consumption of a microcontroller. The microcontroller comprises a central processing unit, a main oscillator, a memory in which is stored a user program for driving the microcontroller, and at least one internal peripheral circuit and a clock tree. The method preferably comprises the steps of:

a) with the microcontroller in a run mode in which the user program is run by the central processing unit, setting the microcontroller into an active halt mode in which the central processing unit, the internal peripheral circuits and the clock tree are deactivated, but in which the main oscillator is operative and delivers an oscillating signal;

b) generating a time delay having a predetermined period, using an internal circuit activated by the oscillating signal; and c) generating an internal interruption, after the time delay, this internal interruption bringing the microcontroller back to the run mode.

The invention also relates to a device for limiting the power consumption of a microcontroller. The microcontroller comprises a central processing unit, a main oscillator, a memory in which is stored a user program for driving the microcontroller, and at least one internal peripheral circuit and a clock tree. The device also comprises:

means for causing the microcontroller to pass from a run mode, in which the user program is run by the central processing unit, to an active halt mode, in which the central processing unit, the internal peripheral circuits and the clock tree are deactivated but in which the main oscillator is operative and delivers an oscillating signal;

time delay generating means controlled by the oscillating signal; and means for generating an interruption bringing the microcontroller (MCU) back to the run mode, which are activated by the time delay generating means.

According to one advantage of the invention, the microcontroller is brought back from the active halt mode to the run mode by internal means. Moreover, this takes place in all cases after the time delay at the latest. This thereby avoids all risks of blocking the microcontroller in the active halt mode.

According to another advantage of the invention, the central processing unit and the internal peripheral circuits are deactivated in the active halt mode, whereupon they do not consume any current. Likewise, Joule losses in the clock tree are avoided. Moreover, the time delay means uses an oscillating signal delivered by the main oscillator so that no additional means, be it internal or external, is required to provide a time base.

BRIEF DESCRIPTION OF THE DRAWINGS

Other characteristics and advantages of the invention shall become more apparent from reading the following description. The latter is purely illustrative and should be read in conjunction with the appended drawings in which.

DETAILED DESCRIPTION OF THE PREFERRED EMBODIMENTS

Figure 1:
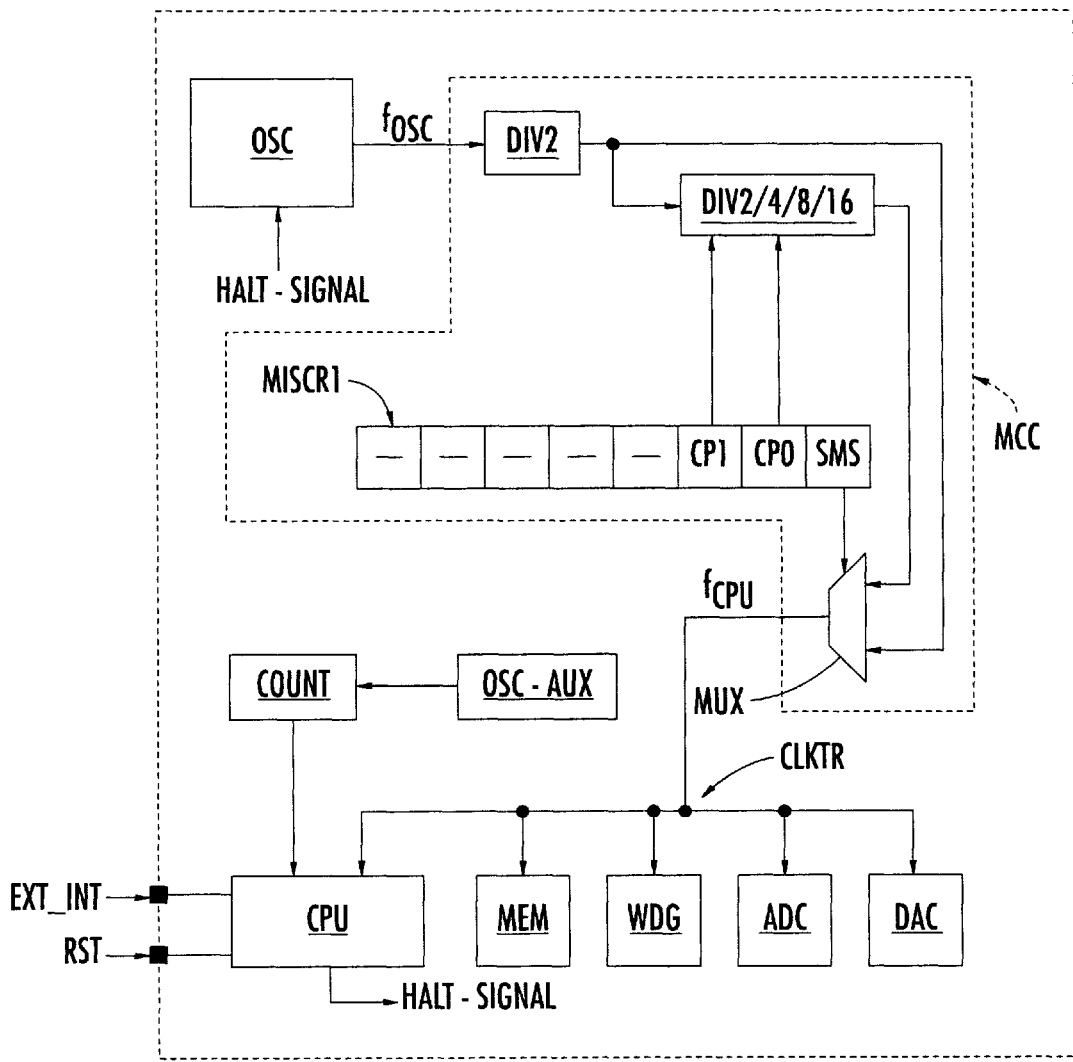
FIG. 1, already partially described, is a diagram of a prior art microcontroller.

In FIG. 1, the central processing unit generates a signal HALT_Signal at the logic 1 state upon executing the halt instruction. This signal is sent to a control input of the main oscillator OSC. The latter does not operate when it receives a logic 1 state on that control input, and operates when it receives a logic 0 state on that control input.

The circuit MCC comprises a divide-by-two frequency counter/divider circuit DIV2 for wave-shaping the oscillating signal $f_{OSC}$. To this end, circuit DIV2 receives the oscillating signal $f_{OSC}$ and delivers to a first input of a multiplexer MUX a periodic square wave signal having half the frequency of signal $f_{OSC}$.

Circuit MCC further comprises a programmable frequency counter/divider DIV2/4/8/16. This circuit receives the oscillating signal $f_{OSC}$ and delivers to a second input of the multiplexer MUX a square wave periodic signal whose frequency depends on the state of two registers, or preferably on two bits CP1 and CP0 of an 8-bit register MISCR1. This frequency is respectively one half, one quarter, one eighth or one sixteenth of the frequency of the signal delivered by circuit DIV2 depending on the value of the doublet formed by the bits CP1 and CP0.

The multiplexer MUX delivers one or the other of the signals delivered by circuits DIV2 and DIV2/4/8/16 depending on the state of a register, or preferably on a bit SMS of the above-mentioned 8-bit register MISCR1. As will have been understood, the signal delivered by the multiplexer MUX forms the clock signal $f_{cpu}$ for the microcontroller MCU.

The value of bit SMS is such that the clock signal by default is the one delivered by the DIV2 circuit. It is modified to set the microcontroller into the SLOW mode, such that the clock signal is the one delivered circuit DIV2/4/8/16. This change is obtained by programming register MISCR1, i.e. by an adapted instruction of the user program.

The advantage of an 8-bit register, such as register MISCR1, is that such a register is programmed in a single programming operation with an 8-bit word. Now, such a word has the elementary size for data in an 8-bit microcontroller.

Figure 2:
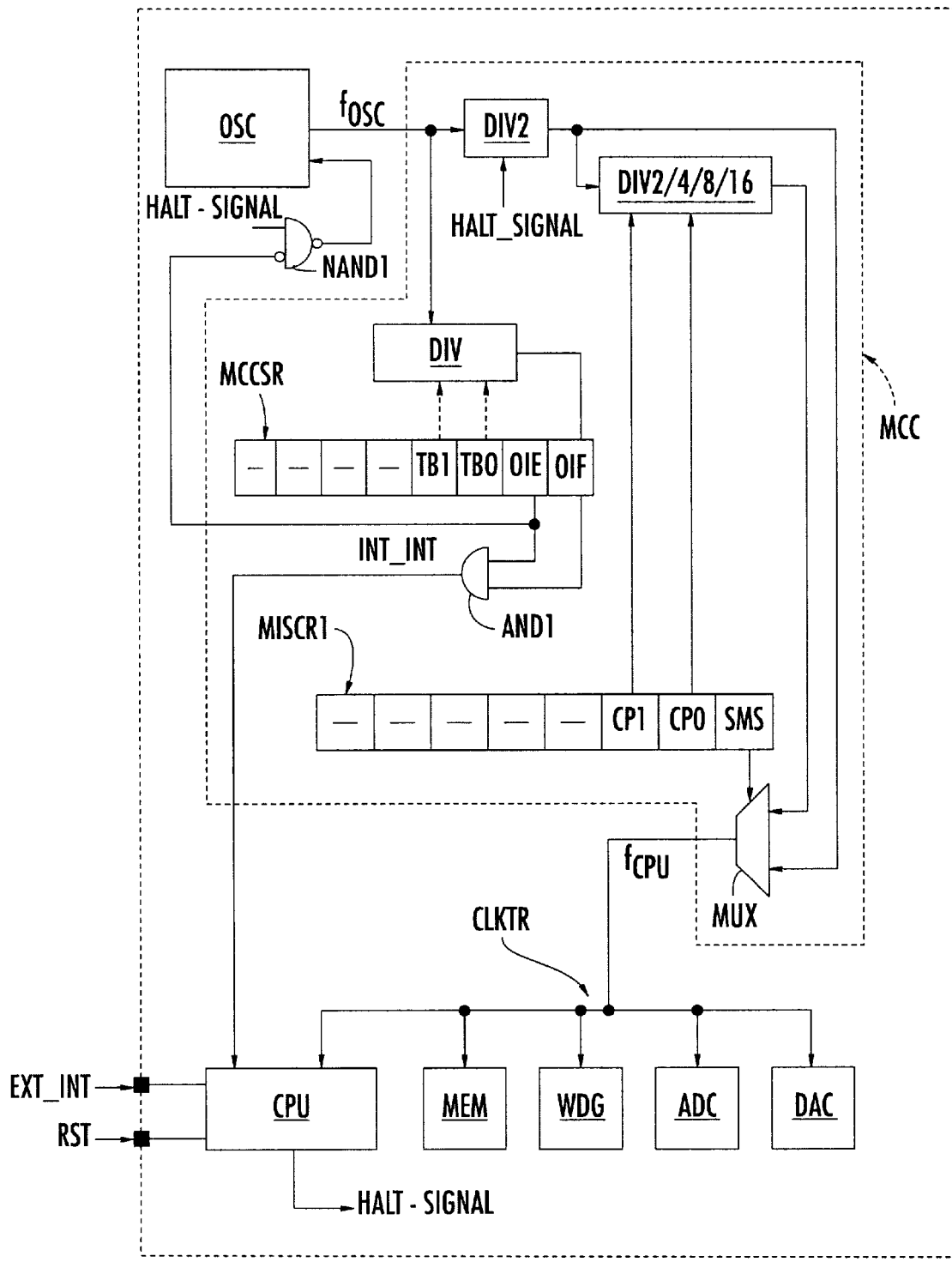
FIG. 2 is a diagram of a microcontroller according to the invention.

In FIG. 2, the same elements as shown in FIG. 1 are given the same references. The microcontroller according to the invention distinguishes from the microcontroller of FIG. 1 in that it comprises a circuit or means for causing the microcontroller to pass from the RUN mode to an ACTIVE-HALT mode. The user program in the RUN mode is run by the central processing unit CPU. All of the microcontroller's internal circuits are activated. By contrast, in the ACTIVE-HALT mode, the central processing unit CPU and the internal peripheral circuits MEM, ADC, DAC and others, as well as the clock tree CLKTR are deactivated. A notable consequence of this is that the clock tree does not pass on the edges of the clock signal $f_{cpu}$. However, in the ACTIVE-HALT mode, the main oscillator is operative and delivers an oscillating signal $f_{OSC}$.

A two-input NAND gate NAND1 receives the above-mentioned signal HALT_Signal on a first input. At a second input, which is an inverting input, gate NAND1 receives the value from a register which shall be discussed later. The output of gate NAND1 is connected to the above-mentioned control input of the main oscillator OSC so as to controllably make that oscillator operative or inoperative.

The means for causing the microcontroller to pass from the RUN mode to the above ACTIVE-HALT mode are combined with time delay means, which are activated by the oscillating signal $f_{OSC}$, and with means for generating an interruption bringing the microcontroller MCU back into the RUN mode. The latter means is activated by the time delay means. All of these means are preferably included in circuit MCC (for reasons connected to the design and testing of the microcontroller), as shown in FIG. 2, but this is not required.

The time delay means preferably comprise a frequency counter/divider circuit DIV whose input receives the oscillating signal $f_{OSC}$. Of course, other ways are envisaged for generating this time delay.

The means for generating an interruption illustratively comprise a first register, or preferably one bit OIF of an 8-bit register MCCSR, which is physically programmable by the time delay means. To this end, the register—or bit OIF—in the example is connected to the output of circuit DIV. In addition, this first register is erasable by programming, i.e. by an adapted instruction in the user program.

Moreover, the means for generating an interruption further comprises a second register, or preferably one bit OIE of register MCCSR. This register or bit OIE is programmable and erasable by programming, i.e. by an adapted instruction of the user program. It needs to have the logic value 1 for the microcontroller to be in the ACTIVE-HALT mode.

The value of the register or bit OIE is sent to the inverting input of the above-mentioned gate NAND1. Note that when the register or bit OIE is at logic 1, the user program HALT instruction (which causes signal HALT_Signal to pass to the logic 1 state) thereby maintains the main oscillator OSC in operation (this is the ACTIVE-HALT mode). Conversely, when the register or bit OIE is at logic value 0, the user program HALT instruction causes the main oscillator OSC to be inoperative (this is the HALT mode, which shall discussed again later).

The signal HALT_Signal is sent to a control input of circuit DIV2 to block the operation of that circuit when signal HALT_Signal has the logic value 1. This makes it possible to deactivate the clock tree CLKTR, and the central processing unit, as well as the internal peripheral circuits. This applies in either the HALT or ACTIVE-HALT mode.

The means for generating an interruption again comprise a gate AND1, which is a two-input AND gate. A first input of gate AND1 receives the value of the first register or bit OIF. A second input of gate AND1 receives the value of the second register or bit OIE. The output of gate AND1 delivers an internal interruption signal INT___INT. The INT_INT signal is sent as an input to the central processing unit CPU.

In a preferred embodiment, the time delay means are programmable so as to make the time delay period variable. The time delay is the time during which the microcontroller is kept in the ACTIVE-HALT mode. To this end, circuit DIV receives the values of two registers, i.e. of two other bits of register MCCSR, namely the bits TB1 and TB0. Depending on the value of the doublet formed by the TB1 and TB0 bits, circuit DIV behaves like a modulo 32,000, 64,000, 160,000 or 400,000 counter. Accordingly, with an oscillating signal $f_{OSC}$ having a frequency equal to 8 MHz, the duration of the time delay is respectively 4 ms, 8 ms, 20 ms or 50 ms. Likewise, with an oscillating signal $f_{OSC}$ having a frequency equal to 16 MHz, the time delay is respectively 2 ms, 4 ms, 10 ms or 25 ms. Because this embodiment is optional, the arrows connecting the registers TB1 and TB0 to circuit DIV are shown in broken lines in FIG. 2.

Naturally, the means of the invention which allow the generation of an internal interruption in the ACTIVE-HALT mode (such an interruption bringing the microcontroller back to the RUN mode) do not exclude an external interruption or an external reset of the microcontroller in that mode (also bringing the microcontroller back into the RUN mode). This is why the microcontroller according to the invention also comprises an input pin for receiving an external interruption signal EXT-INT, and likewise an input pin for receiving an external reset signal RST.

The consumption limiting device according to the invention operates as follows. While it is in the RUN mode, the microcontroller MCU is set to the ACTIVE-HALT mode, for instance by executing an adapted instruction in the user program, known as a HALT instruction. Then comes the time delay step, the latter having a set duration. This step is implemented by an internal circuit which is activated by the oscillating signal $f_{OSC}$, namely the circuit DIV in the example described above. After this time delay, an internal interruption is generated (i.e. signal INT_INT switches). This internal interruption brings the microcontroller back to the RUN mode.

Preferably, the internal interruption causes the user program to carry on from the instruction following the HALT instruction. However, it can be envisaged that the internal interruption causes a particular routine to be executed, notably a reset routine.

Another advantage of the invention lies in that when the microcontroller is brought from the ACTIVE-HALT mode to the RUN mode, there is no need to wait for a stabilization cycle in the main oscillator, as is the case with the HALT mode. Indeed, by contrast with the HALT mode, the main oscillator is not deactivated in the ACTIVE-HALT mode.

In a specific embodiment, the execution of the HALT instruction causes either the microcontroller to be set to the ACTIVE-HALT mode or the microcontroller to be set to the HALT mode, as described above, depending on the state of the register or OIE bit. It will be recalled that in the HALT mode the central processing unit CPU, the microcontroller's internal peripheral circuits, and the clock tree CLKTR are deactivated, and the main oscillator no longer operates (i.e. it no longer generates an oscillating signal $f_{OSC}$).

In this way, one only enters into the ACTIVE-HALT mode if the register or OIE bit allows the internal interruption to be generated after the time delay. This thereby avoids any risk of blocking the microcontroller in the ACTIVE-HALT mode. Naturally, this does not prevent making provisions also allowing for the microcontroller to return to the RUN mode upon receiving either an external interrupt signal EXT_INT or an external reset signal RST on appropriate inputs of the microcontroller package.

Another advantage of the invention lies in that it is possible to set the microcontroller into the ACTIVE-HALT mode even when the watchdog circuit (internal peripheral circuit WDG) is activated. This is not the case with the HALT mode of microcontrollers according to the state of the art. In such microcontrollers the execution of an instruction setting the microcontroller into the HALT mode, while the watchdog circuit is activated, generates an internal reset of the microcontroller or deactivates the watchdog circuit.

Figure 3:
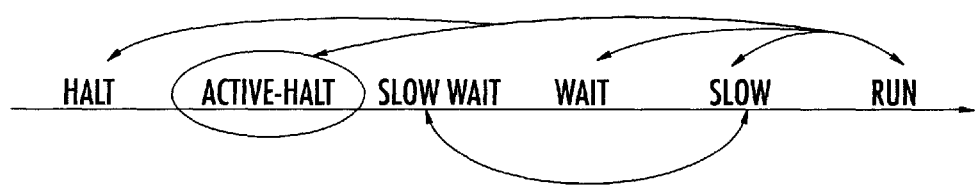
FIG. 3 is an illustration comparing the consumption of the microcontroller according to the invention in its different operating modes.

FIG. 3 indicates the various operating modes of the microcontroller according to the invention on a scale starting from the most economical mode (in which the microcontroller consumption is lowest) to the least economical (in which the microcontroller consumption is highest), going from the left to the right in the figure. There is thus shown, in the following order: the HALT mode, the ACTIVE-HALT mode, the SLOW-WAIT mode, the WAIT mode, the SLOW mode and the RUN mode. In addition, arrows show the different possible transitions from one operating mode to another.

That which is claimed is:

1. A method of reducing consumption of a microcontroller comprising a central processing unit, a main oscillator, a memory in which is stored a user program for driving the microcontroller, at least one internal peripheral circuit, and a clock tree, the central processing unit running the user program when the microcontroller is in a run mode, the method comprising the steps of:
    a) when in the run mode, setting the microcontroller into an active halt mode in which the central processing unit, the at least one internal peripheral circuit, and the clock tree are deactivated, but in which the main oscillator is operative and delivers an oscillating signal;
    b) generating a time delay having a predetermined period using an internal circuit activated by the oscillating signal; and
    c) generating an internal interruption, after the time delay, to set the microcontroller back to the run mode.

2. A method according to claim 1, wherein step a) comprises executing a halt instruction of the user program.

3. A method according to claim 2, wherein at step c) the internal interruption also causes running of the user program to resume from an instruction following the halt instruction.

4. A method according to claim 2, wherein executing the halt instruction causes, depending on a state of a register, either setting the microcontroller into the active halt mode, or setting the microcontroller into a halt mode in which the central processing unit and the at least one internal peripheral circuit are deactivated and in which the main oscillator is no longer operative to generate the oscillating signal.

5. A method according to claim 1, further comprising the step of setting the microcontroller to the run mode upon receiving, at an input of the microcontroller, an external interruption signal.

6. A method according to claim 1, further comprising the step of setting the microcontroller to the run mode upon receiving, at an input of the microcontroller, an external reset signal.

7. A method of reducing consumption of a microcontroller comprising a central processing unit running a user program when in a run mode, a main oscillator, at least one internal peripheral circuit, and a clock tree, the method comprising the steps of:
    when in the run mode, setting the microcontroller into an active halt mode in which the central processing unit, the at least one internal peripheral circuit and the clock tree are deactivated, but in which the main oscillator is operative and delivers an oscillating signal; and
    generating an internal interruption, after a time delay based upon the oscillating signal, to set the microcontroller back to the run mode.

8. A method according to claim 7, wherein the step of setting the microcontroller to the active halt mode comprises executing a halt instruction of the user program.

9. A method according to claim 8, wherein the internal interruption also causes running of the user program to resume from an instruction following the halt instruction.

10. A method according to claim 8, wherein executing the halt instruction causes, depending on a state of a register, either setting the microcontroller into the active halt mode, or setting the microcontroller into a halt mode in which the central processing unit and the at least one internal peripheral circuit are deactivated and in which the main oscillator is no longer operative to generate the oscillating signal.

11. A method according to claim 7, further comprising the step of setting the microcontroller to the run mode upon receiving, at an input of the microcontroller, an external interruption signals.

12. A method according to claim 7, further comprising the step of setting the microcontroller to the run mode upon receiving, at an input of the microcontroller, an external reset signal.

13. A device for limiting consumption of a microcontroller of a type comprising a central processing unit, a main oscillator, a memory in which is stored a user program for driving the microcontroller, at least one internal peripheral circuit, and a clock tree, the device comprising:
    means for causing the microcontroller to pass from a run mode, in which the user program is run by the central processing unit, to an active halt mode, in which the central processing unit, the at least one internal peripheral circuit and the clock tree are deactivated, but in which the main oscillator is operative and delivers an oscillating signal;

time delay generating means controlled by the oscillating signal;

means for generating an interruption setting the microcontroller back to the run mode responsive to the time delay generating means.

14. A device according to claim 13, wherein said time delay generating means comprises a frequency counter/divider circuit receiving the oscillating signal at an input thereof.

15. A device according to claim 13, wherein said means for generating the interruption comprises a first register which is programmable by said time delay generating means and erasable by programming.

16. A device according to claim 15, wherein said means for generating the interruption further comprises a second register which is programmable and erasable by programming.

17. A device according to claim 16, wherein said means for generating the interruption comprise a two-input AND logic gate having first input receiving a value of the first register, a second input receiving a value of the second register, and an output delivering an internal interruption signal.

18. A device according to claim 13, wherein said time delay generating means is programmable to enable selecting a time during which the microcontroller is kept in the active halt mode.

19. A device according to claim 13, wherein further comprising an input pin for receiving an external interruption signal setting the microcontroller back into the run mode.

20. A device according to claim 13, wherein further comprising an input pin for receiving an external reset signal setting the microcontroller back into the run mode.

21. A microcontroller comprising:

a central processing unit;

a main oscillator;

a memory connected to said central processing unit and in which is stored a user program for driving the microcontroller;

at least one internal peripheral circuit connected to said central processing unit;

a clock tree connected to said main oscillator;

a circuit for causing the microcontroller to pass from a run mode, in which the user program is run by the central processing unit, to an active halt mode, in which the central processing unit, the at least one internal peripheral circuit and the clock tree are deactivated, but in which the main oscillator is operative and delivers an oscillating signal;

a time delay generator controlled by the oscillating signal; and a circuit for generating an interruption setting the microcontroller back to the run mode responsive to the time delay generator.

22. A microcontroller according to claim 21, wherein said time delay generator comprises a frequency counter/divider receiving the oscillating signal at an input thereof.

23. A microcontroller according to claim 22, wherein said circuit for generating the interruption comprises a first register which is programmable by said time delay generator and erasable by programming.

24. A microcontroller according to claim 23, wherein said circuit for generating the interruption further comprises a second register which is programmable and erasable by programming.

25. A microcontroller according to claim 24, wherein said circuit for generating the interruption comprise a two-input AND logic gate having first input receiving a value of the first register, a second input receiving a value of the second register, and an output delivering an internal interruption signal.

26. A microcontroller according to claim 21, wherein said time delay generator is programmable to enable selecting a time during which the microcontroller is kept in the active halt mode.

27. A microcontroller according to claim 21, further comprising an input pin for receiving an external interruption signal setting the microcontroller back into the run mode.

28. A microcontroller according to claim 21, further comprising an input pin for receiving an external reset signal setting the microcontroller back into the run mode.

* * * * *